United States Patent
Munguia et al.

(10) Patent No.: US 6,792,478 B2
(45) Date of Patent: Sep. 14, 2004

(54) SYSTEM AND METHOD TO CONFIGURE INPUT/OUTPUT (IO) DEVICES TO USE SELECTED PAIRS OF PORT ADDRESSES

(75) Inventors: Peter R. Munguia, Chandler, AZ (US); Aniruddha P. Joshi, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 220 days.

(21) Appl. No.: 10/112,822

(22) Filed: Mar. 29, 2002

(65) Prior Publication Data

US 2003/0188050 A1 Oct. 2, 2003

(51) Int. Cl.$^7$ .............................. G06F 3/00
(52) U.S. Cl. ................... 710/9; 710/3; 710/8; 710/104
(58) Field of Search .................... 710/3, 8–10, 15, 710/17, 104

(56) References Cited

U.S. PATENT DOCUMENTS

| | | | |
|---|---|---|---|
| 5,367,695 A | 11/1994 | Narad et al. | |
| 5,392,407 A | 2/1995 | Heil et al. | |
| 5,499,346 A | 3/1996 | Amini et al. | |
| 5,524,235 A | 6/1996 | Larson et al. | |
| 5,537,654 A | 7/1996 | Bedingfield et al. | |
| 5,548,730 A | 8/1996 | Young et al. | |
| 5,555,430 A | 9/1996 | Gephardt et al. | |
| 5,579,522 A | 11/1996 | Christenson et al. | |
| 5,761,458 A | 6/1998 | Young et al. | |
| 5,790,849 A | 8/1998 | Crocker et al. | |
| 5,809,330 A | * 9/1998 | Ninomiya | ...................... 710/9 |
| 5,826,105 A | * 10/1998 | Burstein et al. | .............. 710/22 |
| 5,845,136 A | 12/1998 | Babcock | |
| 5,854,905 A | 12/1998 | Garney | |
| 6,047,373 A | 4/2000 | Hall et al. | |
| 6,256,731 B1 | 7/2001 | Hall et al. | |
| 6,415,343 B1 | * 7/2002 | Fensore et al. | ............. 710/104 |

OTHER PUBLICATIONS

Low Pin Count (LPC) INterface Specification, Revision 1.0, Sep. 29, 1997.

* cited by examiner

*Primary Examiner*—Jeffrey Gaffin
*Assistant Examiner*—Eron Sorrell
(74) *Attorney, Agent, or Firm*—Blakely, Sokoloff, Taylor & Zafman LLP (57) ABSTRACT

The present invention relates to a system and method to configure input/output (SIO) devices to use selected pairs of port addresses. The method includes writing a first unique value to a selected port address. The method further includes writing a second unique value to the selected port address. The method also includes performing a read operation on the selected port address to obtain a read value. The method additionally includes setting an input/output (IO) device to use the selected port address.

18 Claims, 5 Drawing Sheets

SYSTEM AND METHOD TO CONFIGURE INPUT/OUTPUT (IO) DEVICES TO USE SELECTED PAIRS OF PORT ADDRESSES

FIELD OF THE INVENTION

The present invention relates generally to data transfer, processor, and memory technologies. More specifically, the present invention relates to a system and method to configure input/output (IO) devices to use selected pairs of port addresses.

BACKGROUND OF THE INVENTION

As computer devices and systems continue to advance and become more complex, effective and efficient techniques for transferring data between various components in computer systems have become more and more important in system design and implementation. In particular, data transfer between I/O devices and other components of a computer system has been frequently examined and improved in order to improve the system's performance and reliability. Generally, a computer system may include multiple I/O devices that are coupled to one or more components in the system (e.g., a controller) via a bus. In such a system, there exists a need to configure addresses of the I/O devices without causing address conflicts and contention on the bus to which the I/O devices are coupled.

DETAILED DESCRIPTION

The present invention relates to a system and method to configure input/output (SIO) devices to use selected pairs of port addresses.

Figure 1:
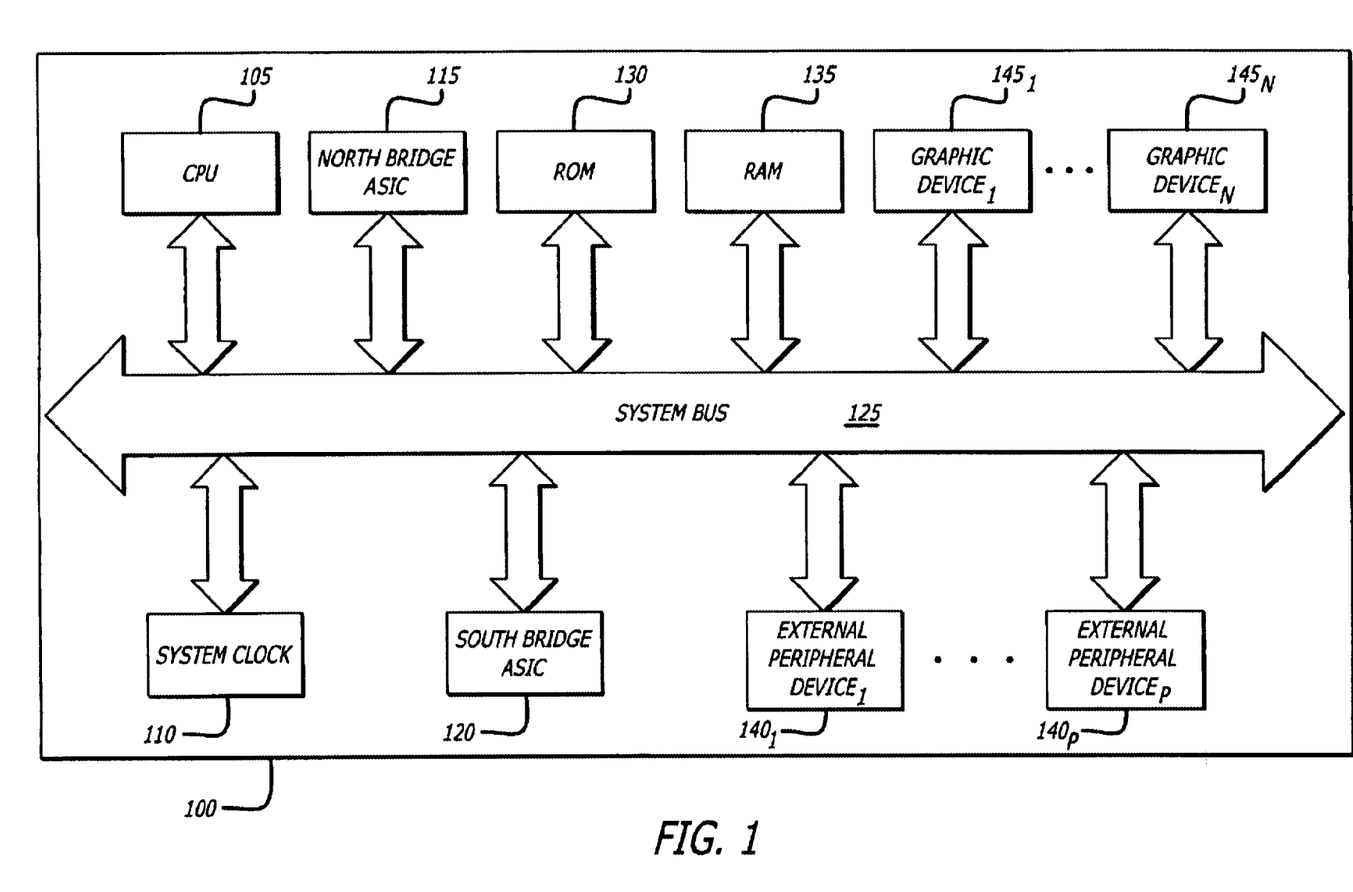
FIG. 1 is an exemplary block diagram showing pertinent functional components of a computing device in accordance with one embodiment of the present invention.

FIG. 1 is an exemplary block diagram showing pertinent functional components of a computing device 100 in accordance with one embodiment of the present invention. An exemplary computing device 100 can be a laptop computer, a desktop computer, a network storage device, a network server, a network storage device, a set-top-box, a hand-held device, a network appliance, or any devices with computing capability.

As shown in FIG. 1, the computing device 100 can include a CPU (Central Processing Unit) 105, a system clock 110, a North Bridge ASIC (Application Specific Integrated Circuit) 115, and a South Bridge ASIC 120. CPU 105, North Bridge ASIC 115, and South Bridge ASIC 120 are operatively coupled to a system address, data, and control bus (or system bus) 125. CPU 105 can communicate with North Bridge ASIC 115 and South Bridge ASIC 120 through the system bus 125. In one embodiment, system bus 125 is a PCI (Peripheral Component Interconnect) bus. System clock 110 generally provides timing pulses at constant time intervals that can be used by other components within the computing device.

North Bridge ASIC 115 can generally serve as a controller for memory devices 130, 135 and graphic devices $145_1, \ldots, 145_N$ (where "N" is a positive integer). Memory devices 130 and 135 can include read-only memory (ROM) 130 and random access memory (RAM) 135. Unlike RAM 135, the contents in ROM 130 are not erased when power is turned off. Furthermore, users typically cannot modify the contents in ROM 130.

South Bridge ASIC 120 can generally serve as a controller for external peripheral devices $140_1, \ldots, 140_P$ (where "P" is a positive integer). Examples of an external peripheral device $140_1, \ldots, 140_P$ may include a hard disk, a keyboard, a mouse, a Universal Serial Bus (USB) peripheral such as a scanner, a printer, a keyboard, a mouse, or a removable media, and other legacy devices.

Figure 2:
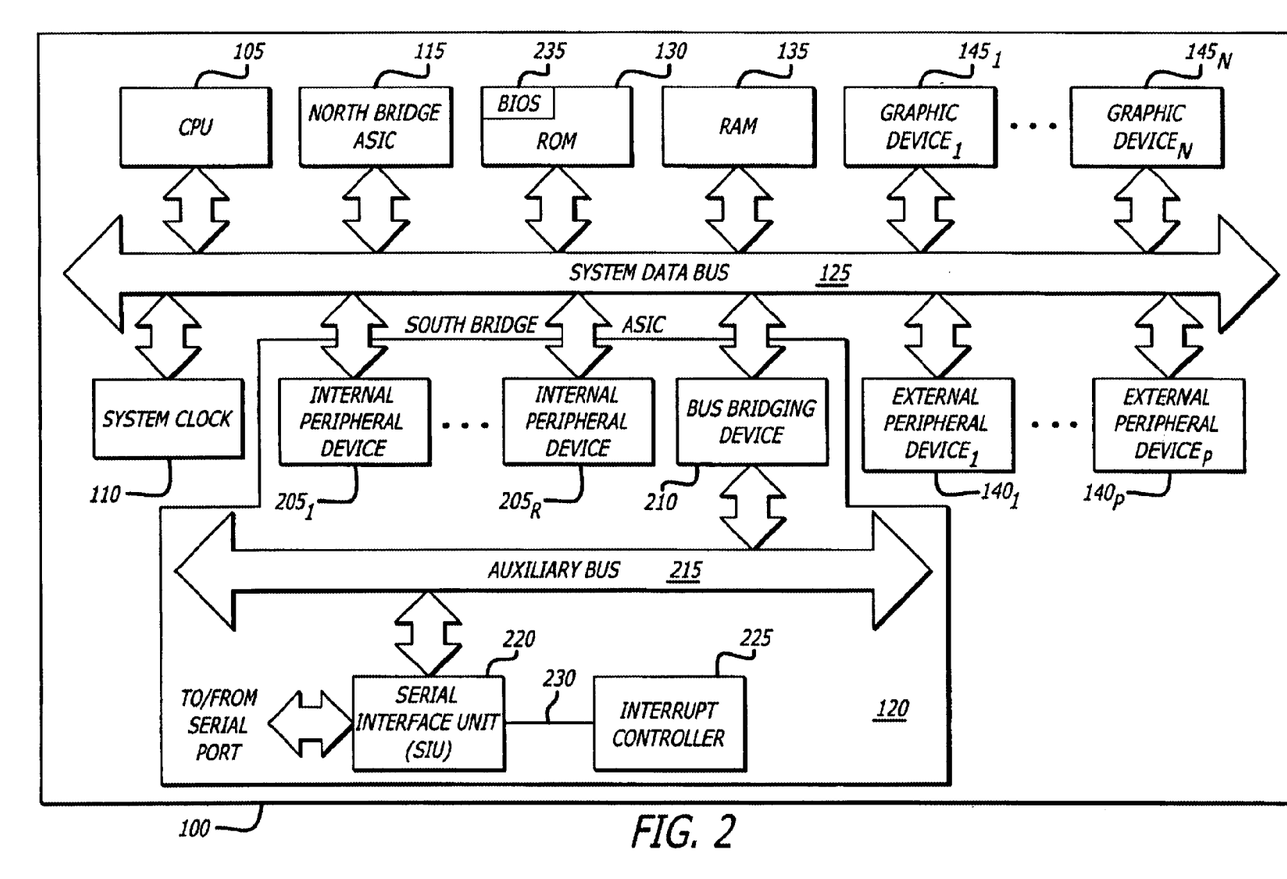
FIG. 2 shows an exemplary block diagram showing pertinent functional components of a computing device with additional details on the South Bridge ASIC in accordance with one embodiment of the present invention.

FIG. 2 shows an exemplary block diagram showing pertinent functional components of a computing device 100 with additional details on the South Bridge ASIC 120 in accordance with one embodiment of the present invention. South Bridge ASIC 120 can include a plurality of internal peripheral devices $205_1, \ldots, 205_R$ (where "R" is a positive integer) that are operatively coupled to the system bus. In one embodiment, examples of internal peripheral devices $205_1, \ldots, 205_R$ may include a hard disk driver controller, a general purpose timer, a PCI bus controller, a serial communication controller, etc.

When a user turns a power on/off switch on, or presses a reset button, the computing device boots itself. Booting generally initiates BIOS (Basic Input/Output System) 235 typically included in ROM 130. BIOS 235 generally facilitates the transfer of data and instructions between the CPU 105 and peripheral devices. BIOS 235 can clear memory, execute diagnostics, and execute other tasks to prepare the computing device for use. When BIOS 235 performs a Power On System Test (POST), BIOS 235 can detect the peripheral devices and modify the configuration addresses of these peripheral devices.

South Bridge ASIC 120 can also include a bus-bridging device 210 that is operatively coupled to the system bus 125 and the auxiliary address, data, and control bus (or auxiliary bus) 215 to generally transfer data back and forth between the system bus 125 and the auxiliary bus 215. In one embodiment, the auxiliary bus 215 conforms to the Low Pin Count (LPC) Specification published by Intel® Corporation.

South Bridge ASIC 120 can further include a Serial Interface Unit (SIU) 220. In one embodiment, SIU 220 can include two standard Universal Asynchronous Receivers/Transmitters (UART). SIU 220 is generally a serial communication controller that is operatively coupled to a standard serial port to receive data signals from the serial port and to transmit data signals to the serial port. SIU 220 can also be operatively coupled to the auxiliary bus 215 in order to communicate with other components 105, 110, 115, 130, 135, $140_1, \ldots, 140_P, 145_1, \ldots, 145_N, 205_1, \ldots, 205_R, 210$ within the computing device 100.

South Bridge ASIC 120 can additionally include an interrupt controller 225. Interrupt controller 225 can generate interrupts that are meant to be processed by the SIU 220. Interrupt controller 225 communicates the generated interrupts to the SIU 220 through interrupt line 230. In one embodiment, interrupt controller 225 can be implemented using Intel chipset 8259®.

Figure 3:
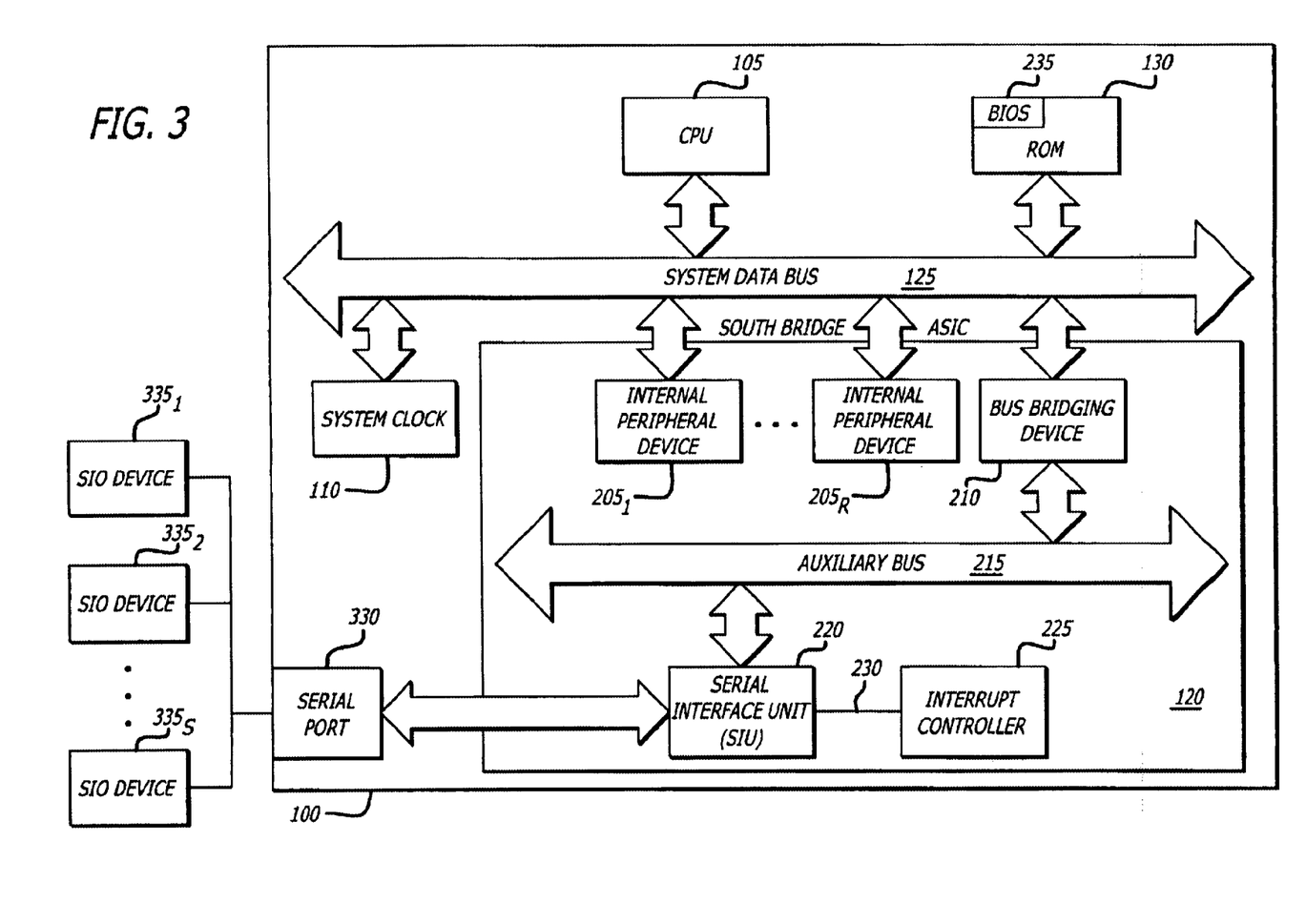
FIG. 3 shows a simplified computing device 100 in accordance with one embodiment of the present invention.

FIG. 3 shows a simplified computing device 100 in accordance with one embodiment of the present invention. As shown in FIG. 3, the computing device 100 can include a standard serial port 330. Super Input/Output (SIO) devices $335_1, \ldots, 335_S$ (where "S" is a positive integer) can be attached to the serial port 330 of the computing device 100. As stated above, SIU 220 is generally a serial communication controller that is operatively coupled to a standard serial port to receive data signals from the serial port and to transmit data signals to the serial port. In addition, SIU 220 can also be operatively coupled to the auxiliary bus 215 in order to communicate with other components 105, 110, 115, 130, 135, $140_1, \ldots, 140_P, 145_1, \ldots, 145_N, 205_1, \ldots, 205_R$, 210 within the computing device 100. As such, SIU 220 can be used to facilitate communication between the SIO devices $335_1, \ldots, 335_S$ and other components 105, 110, 115, 130, 135, $140_1, \ldots, 140_P, 145_1, \ldots, 145_N, 205_1, \ldots, 205_R$, 210 within the computing device 100 using the auxiliary bus 215.

It should be noted that the block diagram of FIG. 3 representing the simplified computing device 100 is a partial block diagram which includes pertinent components 105, 110, 120, 125, 130, $205_1, \ldots, 205_R$, 210, 215, 220, 225, 230, 235. The components 105, 110, 120, 125, 130, $205_1, \ldots, 205_R$, 210, 215, 220, 225, 230, 235 are shown in FIGS. 1 and 2 and described above in the text accompanying those figures.

Figure 4:
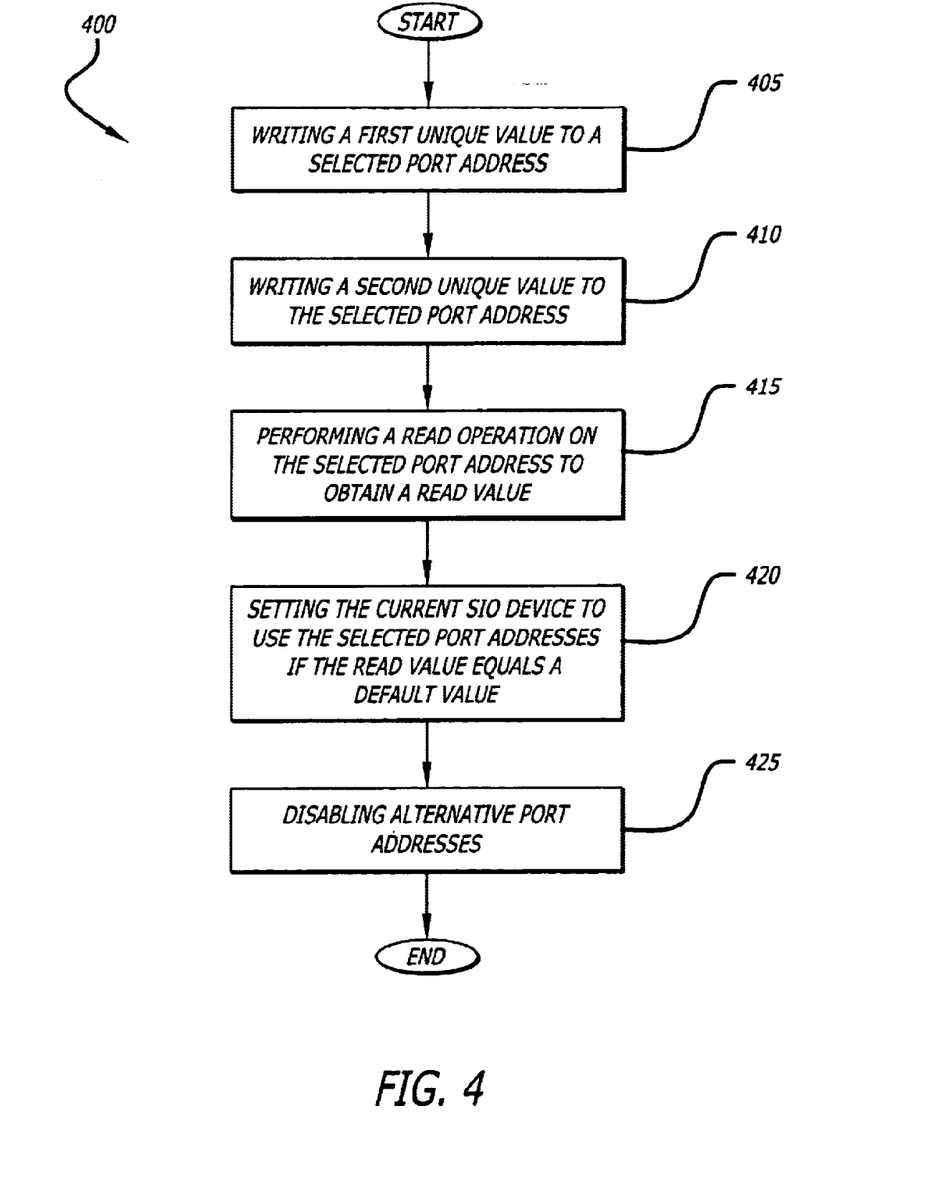
FIG. 4 generally outlines a process to configure port addresses of SIO devices.

FIG. 4 generally outlines a process 400 to configure port addresses of SIO devices $335_1, \ldots, 335_S$ (shown in FIG. 3). The process 400 outlined in FIG. 4 enables BIOS 235 (shown in FIGS. 2 and 3) to configure port addresses of SIO devices without causing address conflicts and contention on the auxiliary bus 215 (shown in FIGS. 1, 2, and 3).

In one embodiment, port addresses of the SIO devices can be configured or accessed through a pair of registers known as the INDEX and DATA registers. In this embodiment, INDEX and DATA registers can generally be used to preserve IO addresses.

In one embodiment, addresses 2Eh and 2Fh or addresses 4Eh and 4Fh can be assigned to the INDEX and DATA registers. To be more specific, if addresses 2Eh and 2Fh were assigned to the INDEX and DATA registers, address 2Eh could be assigned to the INDEX register, and address 2Fh could be assigned to the DATA register. On the other hand, if addresses 4Eh and 4Fh were selected to be the INDEX and DATA registers, address 4Eh could be assigned to the INDEX register, and address 4Fh could be assigned to the DATA register.

It should be noted that other implementations consistent with the principles of the present invention could include additional addresses or address pairs (other than the address pairs of 2Eh/2Fh and 4Eh/4Fh) that could be assigned to the INDEX and DATA registers.

After a power cycle reset or a hardware reset, the computing device 100 goes into a Power-On Self Test (POST). During POST, BIOS should configure each SIO device to use a selected address pair (e.g., 2Eh and 2Fh, or 4Eh and 4Fh) as port addresses of the SIO device. After configuring the SIO device to use the selected address pair as port addresses for the device, BIOS should disable other address pairs that could potentially be used as port addresses for the device.

The above-described embodiment can be used as an example. In the above-described embodiment, address pair of 2Eh and 2Fh and address pair of 4Eh and 4Fh can potentially be selected and designated as port addresses for a SIO device. If BIOS had selected and designated addresses 2Eh and 2Fh as the port addresses for the SIO device, BIOS should disable addresses 4Eh and 4Fh. On the other hand, if BIOS had selected and designated addresses 4Eh and 4Fh as the port addresses for the SIO device, BIOS should disable addresses 2Eh and 2Fh.

To keep the description of FIG. 4 simple and easy to understand, addresses 4Eh and 4Fh will be designated as exemplary selected port addresses that BIOS would configure the current SIO device to use. To be more specific, address 4Eh will be designated as the exemplary selected port address for the INDEX register; and address 4Fh will be designated as the exemplary selected port address for the DATA register. Furthermore, addresses 2Eh and 2Fh will be designated as exemplary alternative port addresses. More specifically, address 2Eh will be designated as the exemplary alternative port address for the INDEX register; and address 2Fh will be designated as the exemplary alternative port address for the DATA register.

It should be noted that the designation of addresses 4Eh and 4Fh as exemplary selected port addresses and the designation of addresses 2Eh and 2Fh as exemplary alternative port addresses is done merely for simplicity and clarity. Further it should also be noted in alternative embodiments of the invention, there could be more than one pair of alternative port addresses supported.

In block 405, BIOS writes a first unique value to a selected port address (e.g., 4Eh) for the INDEX register. In one embodiment, the first unique value can be F0h.

After BIOS writes the first unique value to the selected port address (e.g., 4Eh) for the INDEX register, an SIO device would respond to the write operation performed by the BIOS if the SIO device has been configured to use the selected port addresses (e.g., 4Eh and 4Fh). Therefore if none of the SIO devices respond to the write operation performed by the BIOS, the selected port addresses are not currently used by any of the SIO devices. Furthermore if none of the SIO devices respond to the write operation performed by BIOS, an abort condition would occur.

In one embodiment, a bus master can initiate a bus cycle on the auxiliary bus 215 (shown in FIGS. 2 and 3). Following initiation of the auxiliary bus 215 (shown in FIGS. 2 and 3), a bus slave acknowledges or claims the bus cycle. If no bus slave claims the bus cycle within a specified or predetermined time period, the bus master would abort or abandon the bus cycle.

BIOS can use the abort condition to generally validate that no contention would occur at the selected port addresses (e.g., 4Eh and 4Fh). More specifically, if the abort condition does not occur, BIOS would know or ascertain that an SIO device is currently using the selected port addresses. Therefore, BIOS should abandon the process of configuring the SIO device to use the selected port address to avoid potential address conflicts. Furthermore, BIOS should configure the SIO device to use select alternative port addresses (e.g., 2Eh and 2Fh). However, if the abort condition does occur, BIOS would know or ascertain that none of the SIO devices use the selected port addresses (e.g., 4Eh and 4Fh). As a result, BIOS should continue the process of configuring the SIO device to use the selected port address (e.g., 4Eh and 4Fh).

In block 410, BIOS continues to configure the SIO to use the selected port addresses (e.g., 4Eh and 4Fh) by writing a second unique value to the selected port address (e.g., 4Eh) for the INDEX register. In one embodiment, the second unique value can be 0Fh. In this embodiment, the second unique value, 0Fh, is the inverse of the first unique value, F0H.

It should be noted that by requiring a sequence of two write operations and by using different unique values (namely a first and a second unique value), write operations performed for configuration purposes can be differentiated from mistaken or inadvertent write operations.

After BIOS writes the second unique value to the selected port address (e.g., 4Eh) for the INDEX register, a second abort configuration should occur since the selected port addresses (4Eh and 4Fh) should not be used by any SIO devices. Once the second abort configuration occurs, BIOS should configure the current SIO device to use the selected port addresses (e.g., 4Eh and 4Fh).

It should be noted that once BIOS had configured the current SIO device to use the selected port addresses, the configuration can only be disabled with a power cycle reset or hardware reset. It should also be noted that the write operations performed by BIOS to the selected port address (e.g., 4Eh) for the INDEX register should not affect the default value of the INDEX register. In one embodiment, the default value of the INDEX register can be 00h.

If an intervening cycle causing a value to be written to the selected port address (4Eh) for the INDEX register and the written value is not the same as the second unique value (e.g., 0Fh), BIOS should abort the process of configuring the current SIO device to use the selected port addresses (e.g., 4Eh and 4Fh). In addition, the BIOS should repeat the configuration process starting from block 405.

In block 415, BIOS performs a read operation on the selected port address to obtain a read value. The read value should be the same as the default value stored at the selected port address (e.g., 4Eh) for the INDEX register. As previously stated, the default value can be 00h in one embodiment. If the read value equals to the default value, BIOS should configure or set the current SIO device to use the selected port addresses (e.g., 4Eh and 4Fh) as the port addresses of the SIO device (block 420). If the read value does not equal to the default value (e.g., 00h), BIOS should repeat the configuration process starting from block 405. Furthermore, if an abort condition resulting from the read operation occurs, BIOS should also repeat the configuration process starting from block 405.

In block 425, alternative port addresses (e.g., 2Eh and 2Fh) should be disabled once BIOS had configured the current SIO device to use the selected port addresses (e.g., 4Eh and 4Fh). Disabling alternative port addresses generally comprises marking that the alternative port addresses so that the current SIO device could not be configured to use the alternative port addresses. A more detail description of the disabling of alternative port addresses will be outlined in FIG. 5 and described below in the text accompanying the figure.

Figure 5:
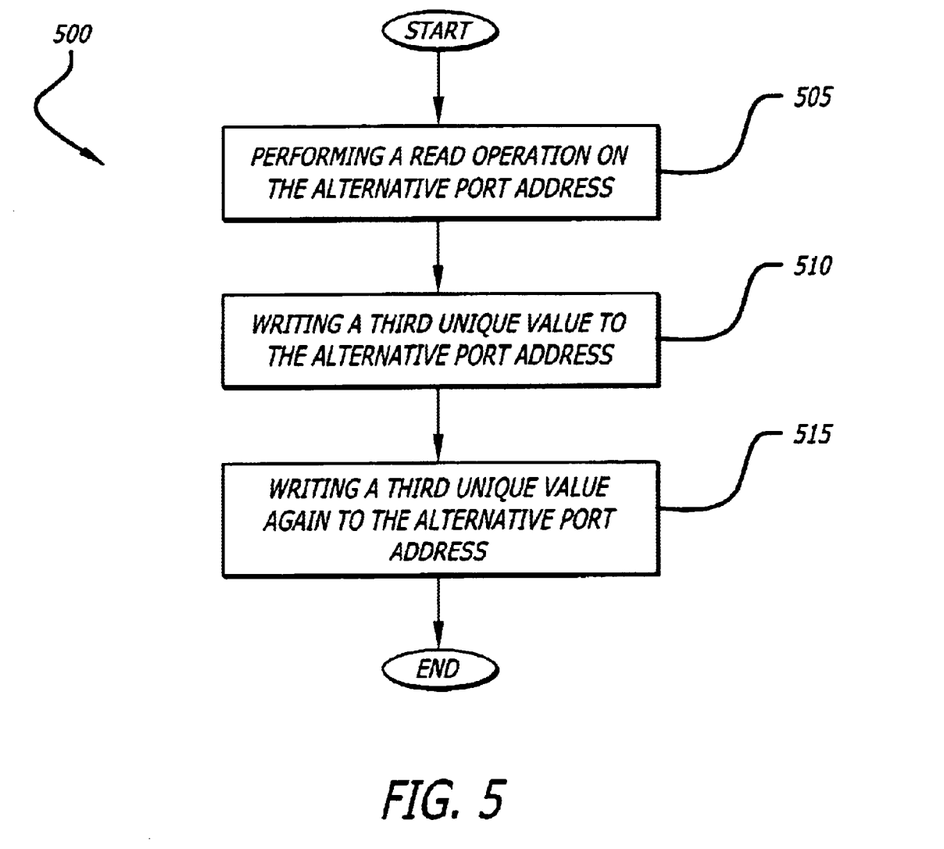
FIG. 5 generally outlines an exemplary process of disabling the alternative port addresses.

FIG. 5 generally outlines an exemplary process 500 of disabling the alternative port addresses. The alternative port addresses should be disabled to improve the robustness of the system. In block 505, BIOS performs a read operation on the alternative port address (e.g., 2Eh) of the INDEX register. If an SIO device were configured to use the alternative port address, a read value would be returned. If a read value were returned, BIOS would preserve the read value and restore the value at the end of the process of disabling the alternative port addresses. If none of the SIO devices were configured to use the alternative port addresses (e.g., 2Eh and 2Fh), the read operation would trigger an abort condition, which is acceptable.

In block 510, BIOS writes a third unique value to the alternative port address (2Eh) for the INDEX register. In general, the third unique value needs to be different than the second unique value (e.g., 0Fh). In one embodiment, the third unique can be 2Eh. If none of the SIO devices were configured to use the alternative port addresses (e.g., 2Eh and 2Fh), the write operation would trigger an abort condition, which is acceptable.

In block 515, BIOS again writes the third unique value (e.g., 2Eh) to the alternative port address (2Eh) for the INDEX register. If none of the SIO devices were configured to use the alternative port addresses (e.g., 2Eh and 2Fh), the write operation would trigger an abort condition, which is acceptable.

Once the alternative port addresses have been disabled after BIOS writes the third unique value (e.g., 2Eh) to the alternative port address (2Eh) for the INDEX register (as shown in block 515 of FIG. 5), the disablement would remain effective until either a power cycle reset or a hardware reset occurs. Furthermore, intervening cycles to or operations performed on the alternative port addresses should be ignored, as they may be valid cycles or operations directed at a secondary device on the auxiliary bus 215 (shown in FIGS. 2 and 3).

It is desirable to have one of the supported pairs of addresses selected and designated as default port addresses to support platforms where there is only one SIO device. In supporting platforms where there is only one SIO device, the configuration process 400 of FIG. 4 and the disabling process 500 of FIG. 5 would still be valid with the certain additional considerations. First, BIOS should execute the sequence to configure the current SIO device to use non-default addresses if these addresses are available. The default addresses should be disabled using the disabling process 500 of FIG. 5, after the current SIO device has been enabled to prevent possible address contention. Second, BIOS should to-configure the current SIO device at POST before attempting to configure any other devices.

It should also be noted that the functional components, as shown in the figures and described above in the text accompanying the figures, could be implemented in hardware. However, these functional components can also be implemented using software code segments. Each of the code segments may include one or more programming instructions. If the aforementioned functional components are implemented using software code segments, these code segments can be stored on a machine-readable medium, such as floppy disk, hard drive, CD-ROM, DVD, tape, memory, or any storage device that is accessible by a computing machine.

While certain exemplary embodiments have been described and shown in accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method, comprising:
   writing a first unique value to a selected port address;
   writing a second unique value to the selected port address;
   performing a read operation on the selected port address to obtain a read value;
   setting an input/output (IO) device to use the selected port address; and disabling an alternative port address, including
   performing a read operation on the alternative port address, and writing a third unique value to the alternative port address.

2. The method of claim 1, wherein setting the IO device further includes:
configuring the IO device to use the selected port address if the read value equals a default value.

3. The method of claim 1, further comprising disabling a second alternative port address.

4. The method of claim 1, wherein the disabling of the alternative port address further includes:
writing the third unique value again to the alternative port address.

5. A system, comprising:
a central processing unit (CPU);
a memory operatively coupled to the CPU through a system bus, the memory stores a basic input/output system (BIOS) to facilitate transfer of data and instructions between the CPU and external peripheral devices;
an application specific integrated circuit (ASIC) operative coupled to the CPU through the system bus to serve as a controller for the external peripheral devices;
a serial port operatively coupled to the ASIC; and
an input/output (IO) device operatively coupled to the serial port;
wherein the BIOS configures the IO device to use a selected port address including
disabling an alternative port address after configuring the IO device to use the and writing a third unique value to the alternative port address.

6. The system of claim 5, wherein the BIOS configures the IO device to use the selected port address by writing a first unique value and a second unique value to the selected port address and performing a read operation on the selected port address to obtain a read value.

7. The system of claim 6, wherein the BIOS configures the IO device to use the selected port address if the read value equals a default value.

8. The system of claim 5, wherein the BIOS disables the alternative port address further includes writing the third unique value to the alternative port address a second time.

9. A computing device, comprising:
a central processing unit (CPU);
a memory operatively coupled to the CPU through a system bus, the memory stores a basic input/output system (BIOS) to facilitate transfer of data and instructions between the CPU and an input/output (IO) device; and
an application specific integrated circuit (ASIC) operatively coupled to the CPU through the system bus to serve as a controller for the IO device;
a serial port operatively coupled to the ASIC; and
an input/output (IO) device operatively coupled to the serial port: port,
wherein the BIOS configures the IO device to use a selected port address including disabling an alternative port address after configuring the IO device to use the selected port address by performing a read operation on the alternative port address, and writing a third unique value to the alternative port address.

10. The computing device of claim 9, wherein the BIOS configures the IO device to use the selected port address by writing a first unique value and a second unique value to the selected port address and performing a read operation on the selected port address to obtain a read value.

11. The computing device of claim 10, wherein the BIOS configures the IO device to use the selected port address if the read value equals a default value.

12. The computing device of claim 9, wherein the BIOS disables an alternative port address after configuring the IO device to use the selected port address.

13. The computing device of claim 12, wherein the BIOS disables the alternative port address by performing a read operation on the alternative port address and writing a third unique value to the alternative port address.

14. The computing device of claim 12, wherein the BIOS disables the alternative part address by performing a read operation on the alternative port address and writing a third unique value twice to the alternative port address.

15. A machine-readable medium comprising instructions which, when executed by a machine, cause the machine to perform operations comprising:
writing a first unique value to a selected port address;
writing a second unique value to the selected port address;
performing a read operation on the selected port address to obtain a read value;
setting an input/output (IO) device to use the selected port address; and
disabling an alternative port address, further including
performing a read operation on the alternative port address, and
writing a third unique value to the alternative port address.

16. The machine/readable medium of claim 15, wherein setting the IO device further includes:
configuring the IO device to use the selected port address if the read value equals a default value.

17. The machine-readable medium of claim 15, further comprising:
disabling a second alternative port address.

18. The machine-readable medium of claim 15, wherein the disabling of the alternative port address further includes:
writing the third unique value again to the alternative port address.

* * * * *

UNITED STATES PATENT AND TRADEMARK OFFICE
CERTIFICATE OF CORRECTION

PATENT NO. : 6,792,478 B2
DATED : September 14, 2004
INVENTOR(S) : Munguia et al.

It is certified that error appears in the above-identified patent and that said Letters Patent is hereby corrected as shown below:

Column 8,
Line 24, delete "part" and insert -- port --.

Signed and Sealed this

Thirty-first Day of May, 2005

JON W. DUDAS
*Director of the United States Patent and Trademark Office*

UNITED STATES PATENT AND TRADEMARK OFFICE
CERTIFICATE OF CORRECTION

PATENT NO. : 6,792,478 B2
DATED : September 14, 2004
INVENTOR(S) : Munguia et al.

It is certified that error appears in the above-identified patent and that said Letters Patent is hereby corrected as shown below:

Column 7,
Line 30, after the second occurrence of "the" insert -- selected port address by performing a read operation on the alternative port address --.

Signed and Sealed this

Ninth Day of August, 2005

JON W. DUDAS
*Director of the United States Patent and Trademark Office*